US012634277B2

(12) United States Patent
Raj et al.

(10) Patent No.: US 12,634,277 B2
(45) Date of Patent: May 19, 2026

(54) ACCESS CONTROL SYSTEM AND METHOD THEREOF

(71) Applicant: Jio Platforms Limited, Gujarat (IN)

(72) Inventors: Pethuru Raj, Karnataka (IN); Senthil Kumar, Karnataka (IN); Yuthika Shekhar, Maharashtra (IN); Akshita Chaudhary, Maharashtra (IN); Vikhyat S. Katapadi, Maharashtra (IN); Aditya Pawar, Maharashtra (IN); Deepak Damodar Sawant, Maharashtra (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 177 days.

(21) Appl. No.: 17/845,750

(22) Filed: Jun. 21, 2022

(65) Prior Publication Data

US 2022/0407852 A1 Dec. 22, 2022

(30) Foreign Application Priority Data

Jun. 21, 2021 (IN) .............................. 202121027765

(51) Int. Cl.
| | |
|---|---|
| *H04L 9/40* | (2022.01) |
| *G06F 21/32* | (2013.01) |
| *G06F 21/34* | (2013.01) |
| *G06F 21/45* | (2013.01) |
| *G07C 9/00* | (2020.01) |

(52) U.S. Cl.
CPC .......... *H04L 63/0853* (2013.01); *G06F 21/34* (2013.01); *G06F 21/45* (2013.01); *G07C 9/00571* (2013.01); *H04L 63/08* (2013.01);

*G06F 21/32* (2013.01); *G06F 2221/2111* (2013.01); *G06F 2221/2115* (2013.01); *G07C 9/00563* (2013.01); *H04L 63/0861* (2013.01)

(58) Field of Classification Search
CPC .......... G06F 21/32; G06F 21/34; G06F 21/45; G06F 2221/2111; G06F 2221/2115; G07C 9/00563; G07C 9/00571; H04L 63/08; H04L 63/0856; H04L 63/0861
See application file for complete search history.

(56) References Cited

U.S. PATENT DOCUMENTS

| | | | | |
|---|---|---|---|---|
| 11,288,530 | B1 * | 3/2022 | Genner | ................... G06F 21/32 |
| 11,727,740 | B1 * | 8/2023 | Bodurka | ............ G07C 9/00571 |
| | | | | 340/5.7 |
| 11,775,631 | B1 * | 10/2023 | Kane | ........................ G06N 3/04 |
| | | | | 726/6 |
| 2016/0290009 | A1 * | 10/2016 | Feirer | .................... G08B 13/08 |
| 2018/0066453 | A1 * | 3/2018 | Dobbins | ................. E05B 63/24 |

(Continued)

*Primary Examiner* — Thomas J Dailey
(74) *Attorney, Agent, or Firm* — FINNEGAN, HENDERSON, FARABOW, GARRETT & DUNNER, LLP

(57) ABSTRACT

The present invention provides a robust and effective solution to an entity or an organization for fully ensuring people and property security by designing and developing an intelligent access control system (ACS) that can provide a smart, swift and simplified user authentication and authorization mechanism. This proposed system may be an event-driven system. A plurality of events such as location-centric, people-inspired, unplanned, and the like can be captured and acted upon by using artificial intelligence along with an adaptive control system.

18 Claims, 10 Drawing Sheets

(56) References Cited

U.S. PATENT DOCUMENTS

| 2019/0244492 | A1* | 8/2019 | Horgan | G08B 13/08 |
| 2021/0201609 | A1* | 7/2021 | Amuduri | G07C 9/253 |
| 2022/0207915 | A1* | 6/2022 | Voss | G07C 9/257 |

* cited by examiner

200 ⟶

DATA INGESTION MODULE 110
/CENTRALIZED SERVER 112

PROCESSOR(S)
202

MEMORY
204

INTERFACE(S)
206

PROCESSING ENGINE
208

DATA ACQUISITION ENGINE
212

AI ENGINE
214

OTHER UNIT(S)
216

DATABASE
210

ACCESS CONTROL SYSTEM AND METHOD THEREOF

FIELD OF INVENTION

The embodiments of the present disclosure generally relate to system and methods that facilitate an authentication and authorization mechanism. More particularly, the present disclosure relates to systems and methods for electronic access control for secured assets including locked facilities.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Physical access control refers to the selective restriction of access to a place or object, and access may include use of some of the functions of an object, or be mediated by transactions governing access to the content of an object. Electronic access control systems and methods are used to overcome the limitations of mechanical locks and keys and providing the control over who, where and when access is granted. In a typical access control system (ACS), the user presents a credential to an intelligent reader which compares the credential's information against an access control list before granting or denying the access request. The credential could be something that the user "knows" (password or PIN); "has" (key fob or tag inside a phone) or "is" (fingerprint or iris scans). The intelligent reader needs to access the access control list (database) which is either stored locally or in a server that is connected with the reader. To ensure correct access control, the list needs to be kept up to date when access level of a user has been changed (revoked or granted), either through communication network or local update.

There are a few critical problems being closely associated with the current ACSs. The technologies used are simply the outdated ones and the ACS controllers are bulky and expensive to buy, install and maintain. If the network is down or if the distant enterprise or cloud servers go down, then the present-day ACSs go down negating and nullifying the overall idea of access control. The network latency also comes into picture and slows down the authentication process. There are cloud-based ACS solutions in plenty. These carry the drawbacks illustrated above. They need a lot of manpower to manage and to guarantee their correct functioning. They are closed, inflexible, network-centric, etc. The ACS controllers are bulky and not energy efficient. Back-end synchronization is mandatory. The fault-tolerance is not there. If the network or the back-end system goes down, then the ground-level ACS is down not doing any transaction. An informal cache is being used in controllers and for a new or infrequent person comes and swipes, his data has to be remotely processed and this consumes more time.

There is therefore a need in the art to provide a system and a method that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide for a system and method to facilitate a fully edge-based, and real-time user authentication.

An object of the present disclosure is to provide for a system and method to facilitate an event-based processing.

An object of the present disclosure is to provide for a system and method to facilitate a policy-based to adapt itself as per the prevailing situation and policies.

An object of the present disclosure is to provide for a system and method to facilitate a cluster-centric architecture in the sense that the higher availability through horizontal scalability is being guaranteed.

An object of the present disclosure is to provide for a system and method to facilitate an application architecture that is microservices-based and hence any kind of futuristic enhancements can be incorporated quickly and easily without any risk.

An object of the present disclosure is to provide for a system and method to facilitate a portable system.

An object of the present disclosure is to provide for a system and method to facilitate a configurable, customizable and composable system.

An object of the present disclosure is to provide for a system and method to facilitate an extensible system to embed newer digital technologies and tools.

SUMMARY

This section is provided to introduce certain objects and aspects of the present invention in a simplified form that are further described below in the detailed description. This summary is not intended to identify the key features or the scope of the claimed subject matter.

In an aspect, the proposed system is configured to authenticate, authorization and access to a user to a locked facility of an entity. The system may include an electronic card, said electronic card stores one or more details pertaining to the identity of the user; a card reader operatively coupled to a locking mechanism of the locked facility of the entity. The card reader may be configured to receive the electronic card. Further the card reader may extract one or more features associated with the one or more details pertaining to the identity of the user when the electronic card is swiped in the locking mechanism. The system may further include an edge controller comprising a processor. The processor may execute a set of executable instructions that are stored in a memory, upon which execution, the processor causes the system to: receive, the one or more features from the card reader and receive, from a database coupled to a server, a knowledgebase comprising a set of user details associated with the user. The system may further extract, a set of attributes corresponding to features associated with the user, the set of attributes extracted from the one or more details pertaining to the identity of the user. The system may then map, through an AI engine, the set of attributes extracted with said knowledgebase to identify if the user is associated with the entity; and upon positive mapping of the set of attributes with the knowledgebase, authenticate the user to further gain access to the locking mechanism associated with the locked facility of the entity.

The present disclosure further provides for a method facilitating authentication, authorization and access to a user to a locked facility of an entity. The method may include the steps of receiving, by an edge controller, one or more features from a card reader, the one or more features may be associated with one or more details pertaining to an identity of the user extracted by the card reader when an electronic card is swiped in a locking mechanism of the locked facility of the entity. The electronic card may store the one or more details pertaining to the identity of the user and the card reader may be operatively coupled to the locking mechanism, and the card reader may be further configured to receive the electronic card. The edge controller may include a processor that executes a set of executable instructions that are stored in a memory. The method may further include the step of receiving, from a database coupled to a server, a knowledgebase comprising a set of user details associated with the user and the step of extracting, a set of attributes corresponding to features associated with the user, the set of attributes extracted from the one or more details pertaining to the identity of the user. The method may further include the step of mapping, through an AI engine, the set of attributes extracted with said knowledgebase to identify if the user is associated with the entity; and upon positive mapping of the set of attributes with the knowledgebase, the method may perform the step of authenticating the user to further gain access to the locking mechanism associated with a locked facility of the entity.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust and effective solution to an entity or an organization for fully ensuring people and property security by designing and developing an intelligent access control system (ACS) that can provide a smart, swift and simplified user authentication and authorization mechanism. This proposed system may be an event-driven system. A plurality of events such as location-centric, people-inspired, unplanned, and the like can be captured and acted upon by using artificial intelligence along with an adaptive control system.

Figure 1:
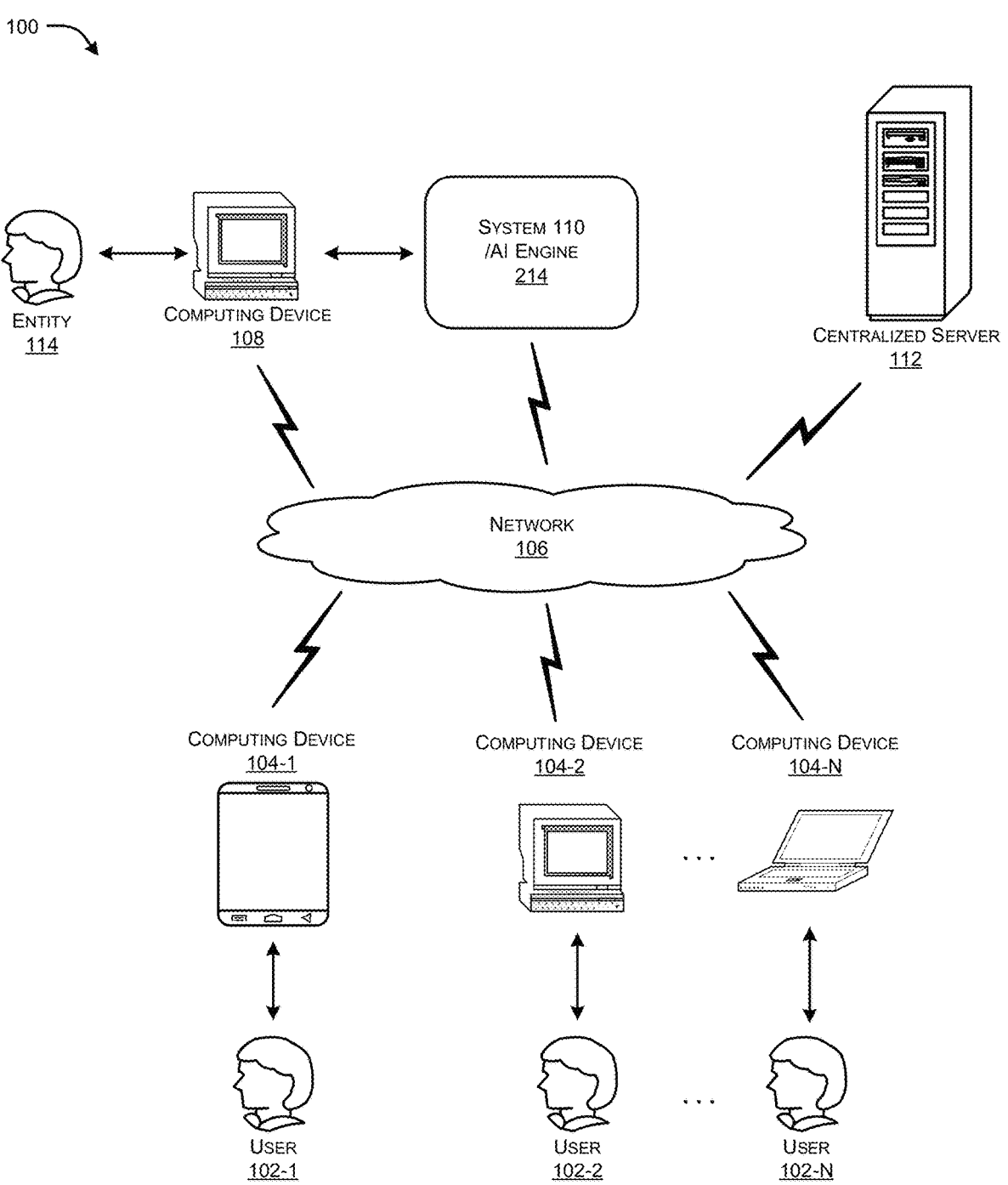
FIG. 1 illustrates an exemplary network architecture in which or with which proposed authentication system of the present disclosure can be implemented, in accordance with an embodiment of the present disclosure.

Referring to FIG. 1 that illustrates an exemplary network architecture for an access system (100) (also referred to as access system (100)) in which or with which the access control system (110) or simply referred to as the system (110) of the present disclosure can be implemented, in accordance with an embodiment of the present disclosure. As illustrated, the exemplary architecture (100) may be equipped with an artificial intelligence (AI) engine (214) for facilitating authentication, authorization and access to users (102-1, 102-2, 102-3 . . . 102-N) (individually referred to as the user (102) or the employer (102) and collectively referred to as the users (102) or the employers (102)) associated with one or more first computing devices (104-1, 104-2 . . . 104-N). The access control system (110) (simply referred to as the system (110) herein) may be further operatively coupled to a second computing device (108) associated with an entity (114). The entity (114) may include a company, a university, a lab facility, a business enterprise, a defence facility, or any other secured facility. The system (110) may be communicatively coupled to the one or more first computing devices (individually referred to as the first computing device (104) and collectively referred to as the first computing devices (104)).

The system (110) may be coupled to a centralized server (112). The system (110) may also be operatively coupled to the one or more first computing devices (102) and the second computing devices (108) through a network (106).

In an embodiment, a user (102) may be associated with an electronic card that may include one or more details pertaining to the identity of the user (102). In another embodiment, a card reader communicatively couple to the system (110) may be configured to read and extract the one or more details pertaining to the identity of the user (102) and transmit a set of extracted features from the one or more details pertaining to the identity of the user (102) to the system (110).

In an embodiment, the centralized server (112) may be operatively coupled to a database associated with the system (110). The database may include a knowledgebase based on one or more details of the users (102). The one or more details may include registration details, name, age, nationality, entity code number, id, pan details, aadhar details, account details, biometric feature details but not limited to the like.

In an embodiment, the AI engine (214) may be then configured to map any or a combination of extracted features with said knowledgebase to identify and authenticate the user (102). Once the authentication is received, the user (102) may gain access to a locking mechanism associated with the locked facility, and the user (102) may close and open the locked facility upon swiping of the electronic card in the card reader. The system (110) may be further operatively coupled to a plurality of sensors to sense opening and closing of the locking mechanism, breakage and tempering of the locking mechanism but not limited to the like.

In an embodiment, the system (110) may be configured to obtain a registration data based on a request from an unregistered user through respective user device (104). In an exemplary embodiment, the login credentials may be generated based on acknowledgement of the request and verification of the registration data. In another exemplary embodiment, the user (102) may enter the generated login credentials to access the system to obtain the information service associated with the user (102).

In yet another embodiment, the system (110) may store consent of the user to store biometric features of the user (102) that may include privileged information services and upon receipt of the consent of the user the system (110) may store the biometric features of the user. In another embodiment, the biometric features may be stored based on the biometric scanners such as a face-recognition camera but not limited to the like.

In another embodiment, the AI engine (214) may identify and authenticate the user (102) through any or a combination of voice, password, OTP, facial feature, fingerprint, iris, DNA, skin, ear lobe, nose but not limited to these stored in the database.

In an embodiment, based on the fast-emerging edge/fog computing paradigm. Thereby, data capture and processing happen locally and instantaneously. Resultantly, the user authentication task is completed quickly.

In an embodiment, the system (110) may include an edge-based access control system (ACS) (also referred to as the access control platform herein) but not limited to it. The ACS may include an edge controller but not limited to it. A set of instructions and a database may be deployed and runon production-grade cloud environments but not limited to it. In an exemplary embodiment, the ACS, can function independently to transact and complete user authentication. In yet another embodiment, remote updation and synchronization may take place with a cloud-based application and database.

In an embodiment, the system (110) may be operatively coupled to one or more fire alarms, public address systems, emergency switches in a wireless and wireline manner.

In an embodiment, the database may be local to the system (110) and may include all user details of the entity. Therefore, the mapping of the user details with the features extracted by the card reader and transmitted through wired or wireless intranet take place instantaneously, for example in nano seconds. Therefore, the authentication and the access mechanism may work even without the availability of internet services. Moreover, hacking by a third party may also not be feasible due to this feature and the access system may remain totally secured. The leveraged edge/fog computing may perform the authentication task perfectly even if there is a loss of network connectivity.

In another embodiment, the database may be coupled to a cloud and the mapping of the user details with the features extracted by the card reader may take place through the cloud whenever required. Hence, even if the back-end ACS (110) and the corresponding database are not delivering their duties, the access system (100) may work well.

In an embodiment, the system (110) may be a system on chip (SoC) system but not limited to the like. In another embodiment, an onsite data capture, storage, matching, processing, decision-making and actuation logic may be coded using microservices architecture (MSA) but not limited to it. A plurality of microservices may be containerized and may be event based in order to support portability.

In an embodiment, the system architecture (100) may be modular and flexible to accommodate any kind of changes in the system (110) as proximate processing may be acquired towards real-time authentication and dependency-induced risks may be totally eliminated. The system (110) configuration details can be modified on the fly.

In an embodiment, the system (110) may be remotely monitored and the data, application and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, a network 106 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server 110 may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (102), the one or more second computing devices (104) may communicate with the data ingestion module (110) via set of executable instructions residing on any operating system, including but not limited to, Android™, iOS™, Kai OS™ and the like. In an embodiment, to one or more first computing devices (102), and the one or more second computing devices (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the one or more second computing devices (108) may not be restricted to the mentioned devices and various other devices may be used. A smart computing device may be one of the appropriate systems for storing data and other private/sensitive information.

Figure 2:
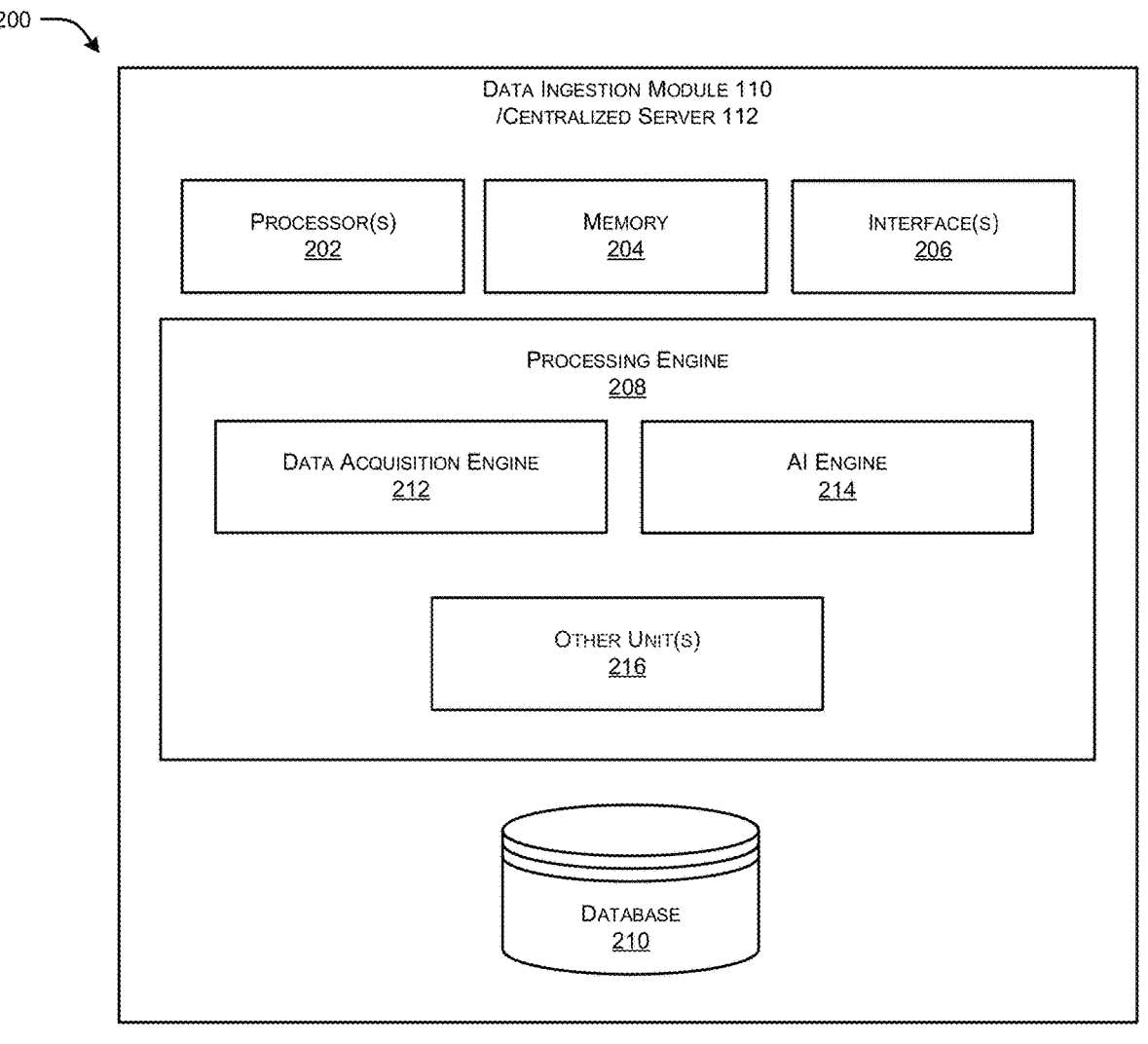
FIG. 2 illustrates an exemplary representation of proposed authentication system/centralized server for accessing content stored in a network, in accordance with an embodiment of the present disclosure.

FIG. 2A with reference to FIG. 1, illustrates an exemplary representation of system (110)/centralized server (112) for facilitating real time event data feeds, in accordance with an embodiment of the present disclosure. In an aspect, the system (110)/centralized server (112) may comprise one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110)/centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the system (110). The interface(s) 206 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a data acquisition engine (212), an artificial intelligence (AI) engine (214), and other engines (216). The processing engine (208) may further edge based micro service event processing but not limited to the like.

FIG. 2B illustrates an exemplary representation of a proposed method (250) in accordance with an embodiment of the present disclosure. As illustrated, the method (250) may facilitate authentication, authorization and access to a user to a locked facility of an entity. The method (250) may include at 252 the step of receiving, by an edge controller, one or more features from a card reader, the one or more features may be associated with one or more details pertaining to an identity of the user extracted by the card reader when an electronic card is swiped in a locking mechanism of the locked facility of the entity. The electronic card may store the one or more details pertaining to the identity of the user and the card reader may be operatively coupled to the locking mechanism, and the card reader may be further configured to receive the electronic card. The edge controller may include a processor that executes a set of executable instructions that are stored in a memory. The method may further include at 254, the step of receiving, from a database coupled to a server, a knowledgebase comprising a set of user details associated with the user and at 256, the step of extracting, a set of attributes corresponding to features associated with the user, the set of attributes extracted from the one or more details pertaining to the identity of the user. The method (250) may further include at 258, the step of mapping, through an AI engine, the set of attributes extracted with said knowledgebase to identify if the user is associated with the entity; and upon positive mapping of the set of attributes with the knowledgebase, the method may perform at 260, the step of authenticating the user to further gain access to the locking mechanism associated with a locked facility of the entity.

Figure 3:
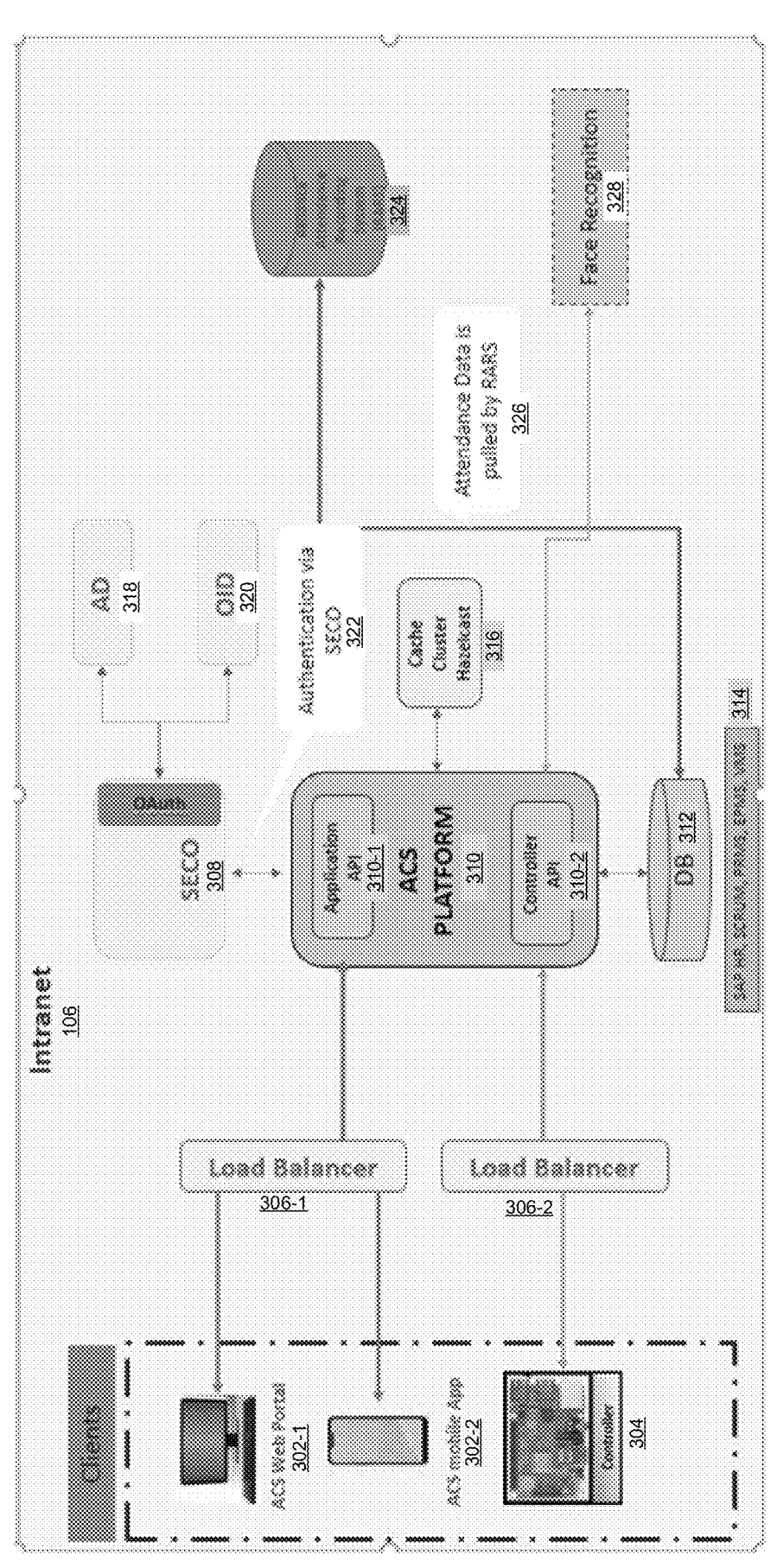
FIG. 3 illustrates an exemplary representation of the system architecture (300), in accordance with an embodiment of the present disclosure.

FIG. 3 illustrates an exemplary representation of the system architecture (300), in accordance with an embodiment of the present disclosure.

As illustrated, in an embodiment, a computing system of the entity may include an interface on a computing device (302-1) (also referred to as web portal (302-1)) and an interface on a mobile computing device (302-2) (also referred to as the mobile application (302-2)) coupled to an access control platform (310) through a first load balancer (306-1). The computing system of the entity may further include a controller (304) coupled to the access control platform (310) through a second load balancer (306-2). The access control platform (310) may include an application programming interface (310-1) and a controller application programming interface (310-2). The access control platform (310) may be further coupled to a cache cluster (316), a database (312), a face recognition module (328), and sequential coding (SECO) module (308) comprising an Active directory (318) and Oracle internet directory (320). The authentication (322) may be performed through the SECO module that may be coupled to the attendance recording system (ARS) (324).

Figure 4:
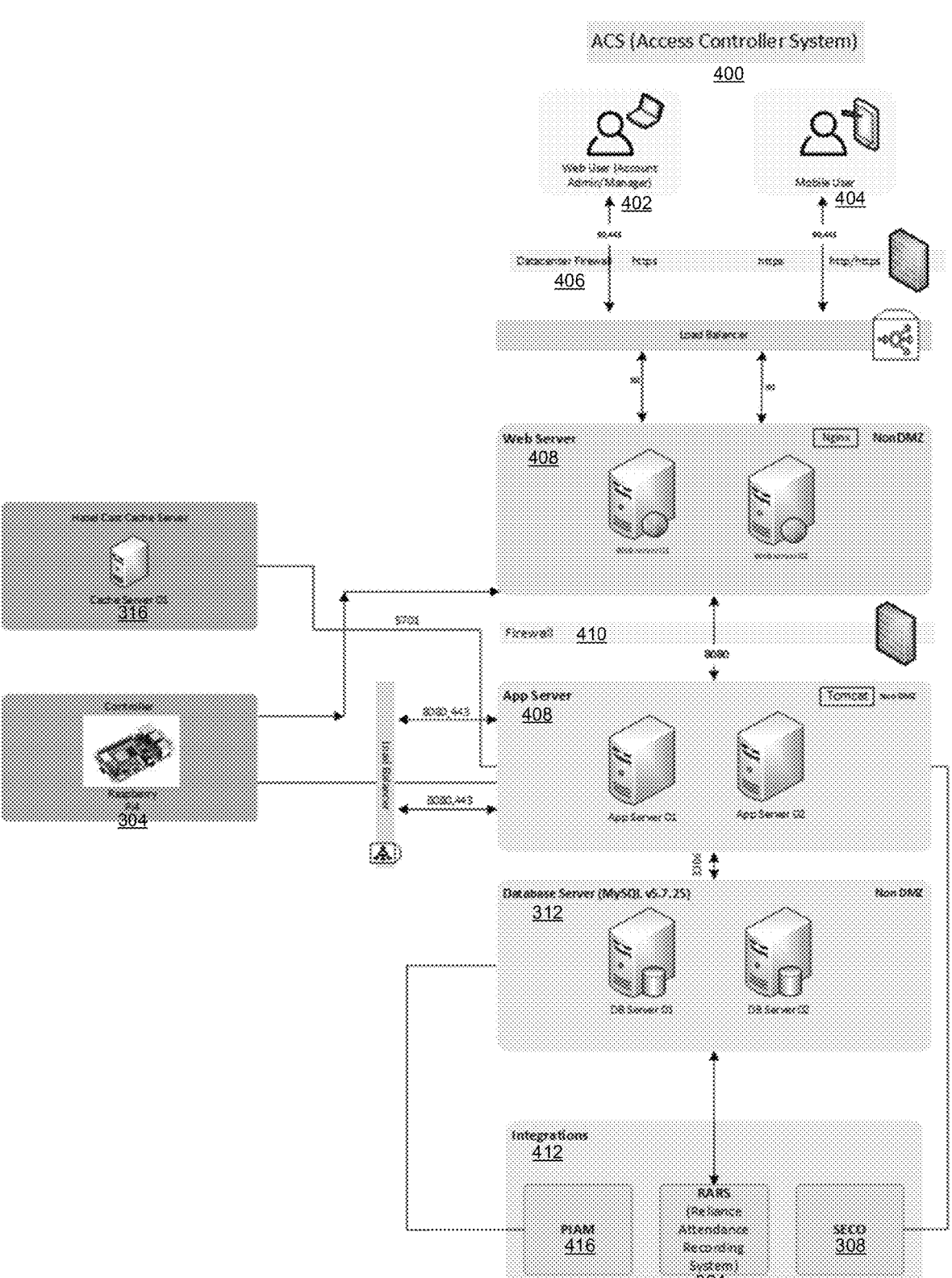
FIG. 4 illustrates an exemplary representation of a deployment architecture (400), in accordance with an embodiment of the present disclosure.

FIG. 4 illustrates an exemplary representation of an access control system (ACS) (400), in accordance with an embodiment of the present disclosure.

As illustrated, in an embodiment, the ACS (400) may include a user associated with a computing device (402) and another user associated with a mobile computing device (404) operatively coupled to a load balancer (306) and protected through a firewall (406). The load balancer may be further operatively coupled to a web server (408), an application server (412) and a database server (312) protected again through a firewall (410). The database server (312) may be further coupled to external integrations (414) such as physical identity and access management (PIAM) (416), attendance recording system (324) and SECO (308). An access control unit (304) and the cache cluster (316) may be communicatively coupled to the servers through the load balancer (306).

In an exemplary embodiment, the user with a card may swipes the card at a door controller. The door controller may capture the card details and may pass the card details to the ACS controller. The data captured may get compared with the entries in the in-memory database, which is embedded inside the ACS controller. If the details match, then an appropriate message may get transmitted to the door controller to open or close the door.

Figure 5:
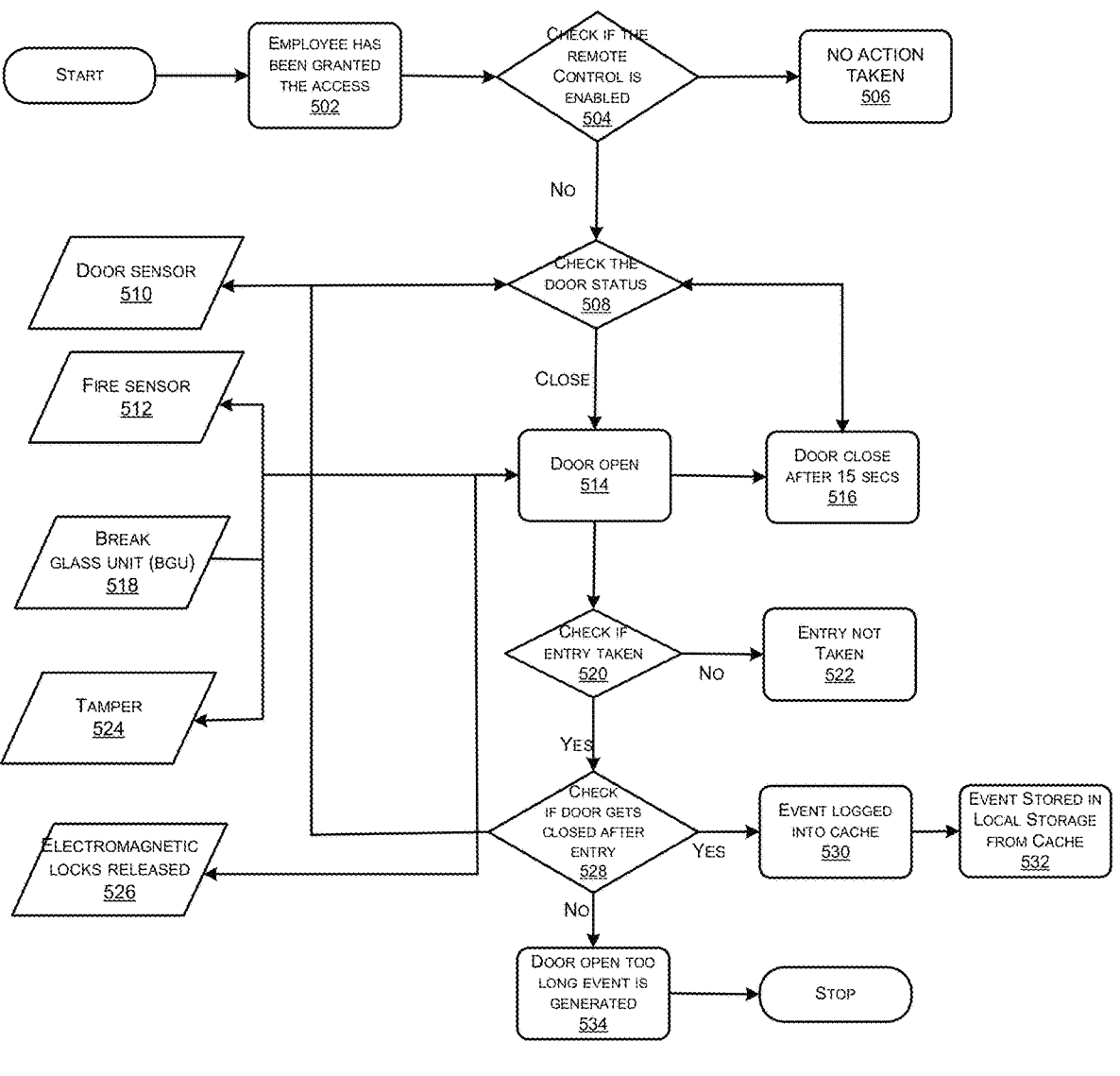
FIG. 5 illustrates an exemplary block diagram representation of user authentication process flow (500), in accordance with an embodiment of the present disclosure.

FIG. 5 illustrates an exemplary block diagram representation of user authentication process flow (500), in accordance with an embodiment of the present disclosure. As illustrated, in an embodiment, the user authentication process may start after the user has been granted access at block 502. If at block 504, the remote control is enabled, no action is taken at block 506. If at block 504, the remote control is not enabled then the status of the door at block 508 may be checked from the information received from a door sensor (510). If the door is closed, control signals are sent to open the door at block 514. If the door is already open, then at block 516, control signals may be sent to close the door after a predefined period of time. If any adverse signals are received from any or a combination of a fire sensor (512), break glass unit (BGU) (518) or if the door is tampered (524), then at block 514, the door opens. Once the door opens, at block 520 entry has been made or not is checked. If entry is taken, at block 528, the door gets closed or not is checked. If closed, at block 530, the event is locked into cache and at block 532, then stored into a local storage from the cache. If the door is not closed then at block 534, an event that the door is open too long may be generated.

Figure 6:
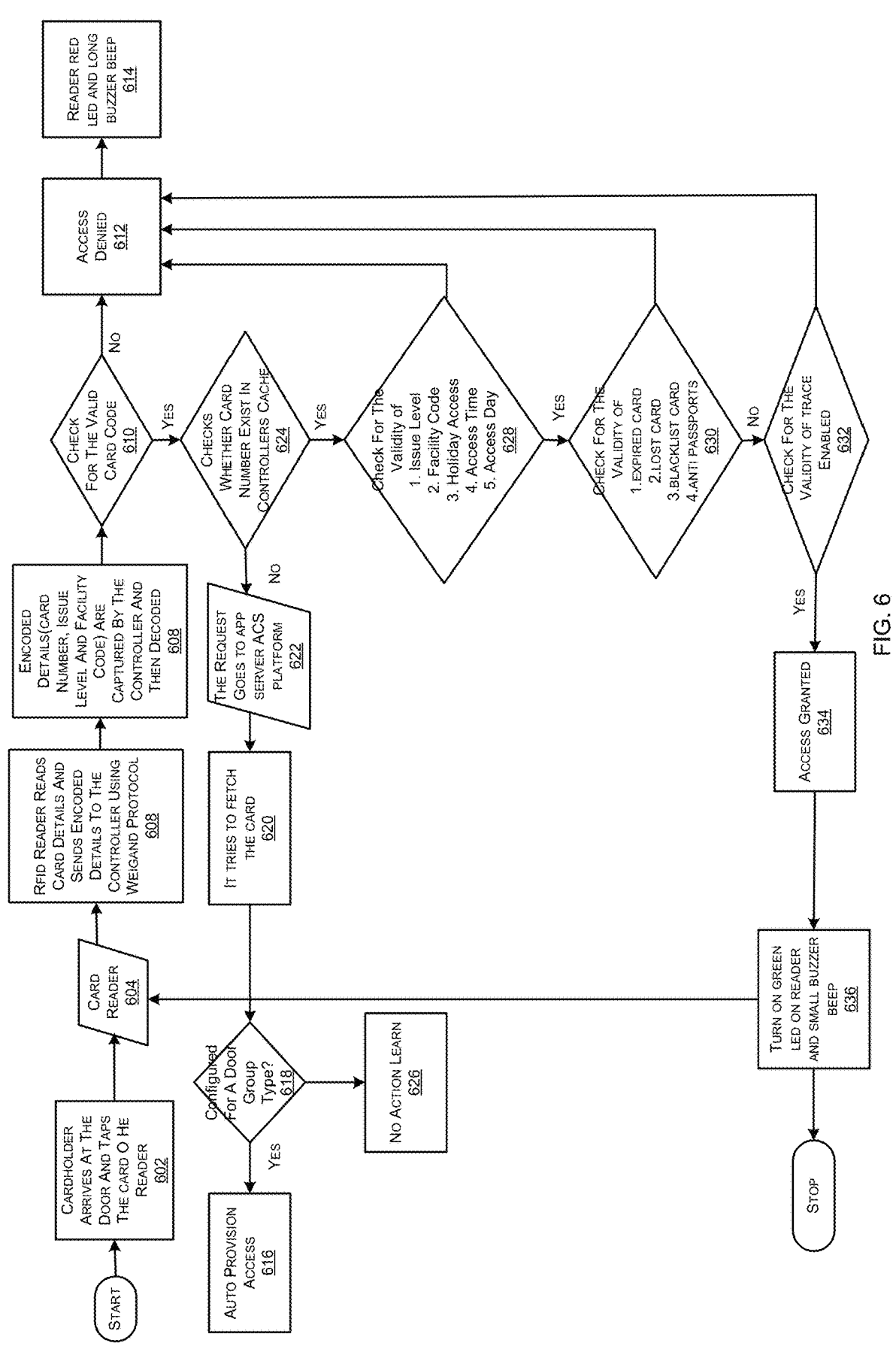
FIG. 6 illustrates an exemplary block diagram representation (600) of event capture and processing, in accordance with an embodiment of the present disclosure.

FIG. 6 illustrates an exemplary block diagram representation (600) of event capture and processing, in accordance with an embodiment of the present disclosure. As illustrated, in an embodiment, a plurality of events at the user side may get immediately captured by the local ACS controller and the plurality of events may be sent to the cloud-hosted application. Appropriate actions may taken at the cloud side and the corresponding messages get communicated to respective divisions to take the necessary actions in time. At block 602, the user or the cardholder arrives at the door and taps the card on the card reader at block 604. AT block 606, an RFID sensor reads the card details and sends encoded details to the controller. At block 608, the encoded details such as the card number, issue level, facility code and the like may be captured by the controller and then decoded. At block 610 checking for the valid card code may be done. If the card is invalid then at block 612, access is denied and a reader red led and buzzer may go off at block 614. If the card is valid, then at block 624 the card number is checked if it exists in the cache of the controller. If the card number exists, then at block 628 and 630, then validity level is checked. At block 632, validity of trace is enabled is checked. If it is enabled then at block 634, access is granted and at block 636, the green led and a small buzzer beep is turned on. If the trace is not enabled then at block 634 and at block 612 access is denied. If the card number does not exist at the cache of the controller, then at block 622, the request may go to the application server to again provide encoded details at block 608 or card details are tried to be fetched at block 620 that may be configured for a door type at block 618 and may provide auto provision access at block 616 for a predefined door type or else no action may be taken at block 626.

Figures 7A, 7B:
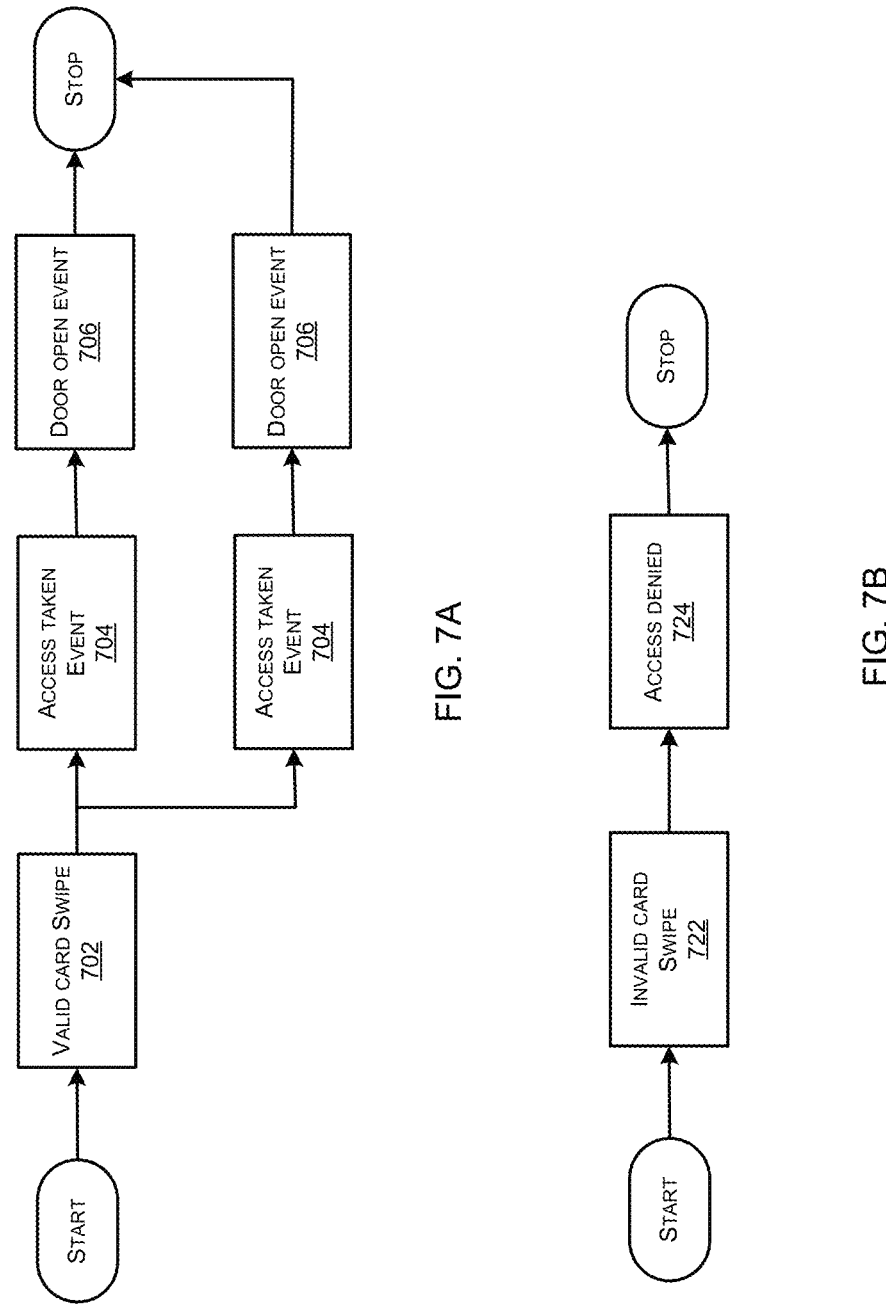
FIGS. 7A-7B illustrate exemplary block diagram representations (700) of event generation flow, in accordance with an embodiment of the present disclosure.

FIGS. 7A-7B illustrate exemplary block diagram representations (700) of event generation flow, in accordance with an embodiment of the present disclosure. As illustrated in FIG. 7A, in an embodiment, event generation flow process for a valid swipe may include at block 702 a valid card swipe, that may either perform at least two functions, a first function ACCESS_TAKEN event may be generated at block 704 that may lead to DOOR_OPEN event at block 706. The second function may include at 708 ACCESS_NOT_TAKEN event may be generated that may lead to DOOR_CLOSE event at block 710. FIG. 7B illustrates, in an embodiment, event generation flow process for an invalid swipe and may include at block 722 Invalid swipe that may lead to ACCESS_DENIED at block 724.

Figures 8, 9:
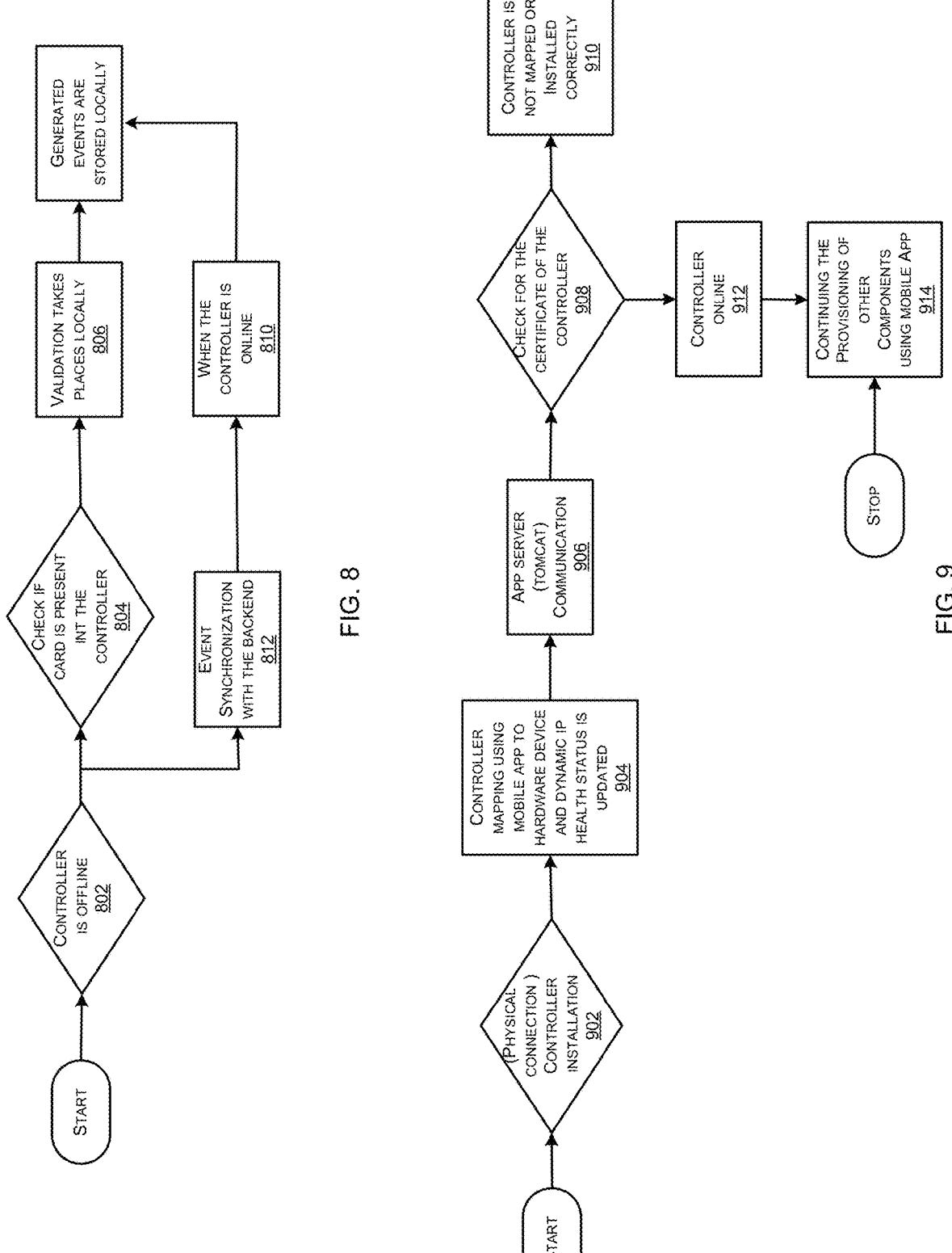
FIG. 8 illustrates an exemplary block diagram representation (800) of offline event generation flow, in accordance with an embodiment of the present disclosure.
FIG. 9 illustrates an exemplary block diagram representation (900) of controller installation flow, in accordance with an embodiment of the present disclosure.

FIG. 8 illustrates an exemplary block diagram representation (800) of offline event generation flow, in accordance with an embodiment of the present disclosure. As illustrated, in an embodiment, offline event generation flow process may include at block 802 the query if controller is offline. If the controller is offline, then at block 804 whether card is present in the controller is checked. If the card is present, then at block 806, validation may take place locally and at block 808, the generated events are stored locally. When the controller comes online at block 810, then at block 812 event is synchronized at the backend which may be also performed if the controller was online when checking was done at block 802.

FIG. 9 illustrates an exemplary block diagram representation (900) of controller installation flow, in accordance with an embodiment of the present disclosure. As illustrated, in an embodiment, the controller installation flow process may include physically connecting the controller at block 902, then at block 904, the controller may be mapped using mobile application to hardware device, and dynamic IP and health status is updated. The data may be then sent to an application server communication at block 906. At block 908, the certificate of the controller may be checked. If available then at block 912 controller may be online and then at block 914, supervision of other blocks may be continued by the mobile app. If the controller certificate is not available then at block 910 the controller may not be mapped or installed properly.

Figures 10, 11:
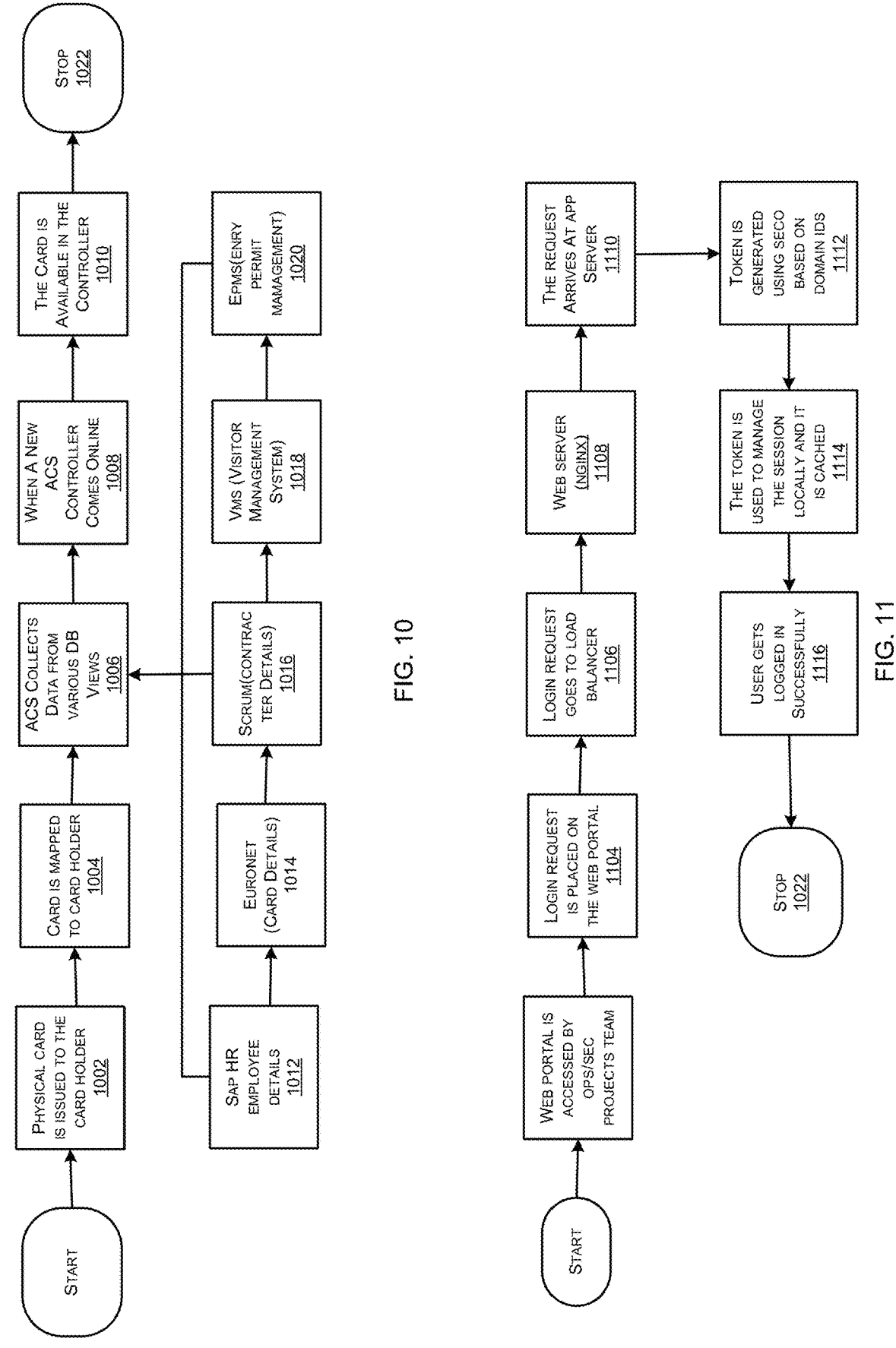
FIG. 10 illustrates an exemplary representations of external integrations flow, in accordance with an embodiment of the present disclosure.
FIG. 11 illustrates an exemplary block diagram representation (1100) of registration detail flow, in accordance with an embodiment of the present disclosure.

FIG. 10 illustrates an exemplary representations of external integrations flow, in accordance with an embodiment of the present disclosure. As illustrated, in an embodiment, external integrations flow process may include at block 1002 Physical card may be issued to the user or the cardholder, where at block 1004, the card may be mapped to the cardholder. At block 1006, ACS may collect data from various database views when at block 1008 a new ACS controller may come online so that at block 1010 the card may be available in the controller. The external integrations may include SAP HR (user details) at block 1012, Card details at block at 1014, second user or the contractor details at block 1012, a visitor management system at block 1018 and entry permit management system at block 1020.

FIG. 11 illustrates an exemplary block diagram representation (1100) of registration detail flow, in accordance with an embodiment of the present disclosure.

As illustrated, in an embodiment, the registration detail flow process (1100) may include at block 1102 an interface such as a web portal being accessed by section operators, section project team and at block 1104 login request is placed in the web portal. The login request then goes to load balancer at block 1106 which may then be sent to the web server at block 1108 after which the login request arrives at the application server at block 1110. At block 1112 token may be generated using SECO based on domain ids. At block 1114, the token may be used to manage the session locally and the token may be cached which may let the user to get logged in successfully.

Figure 12:
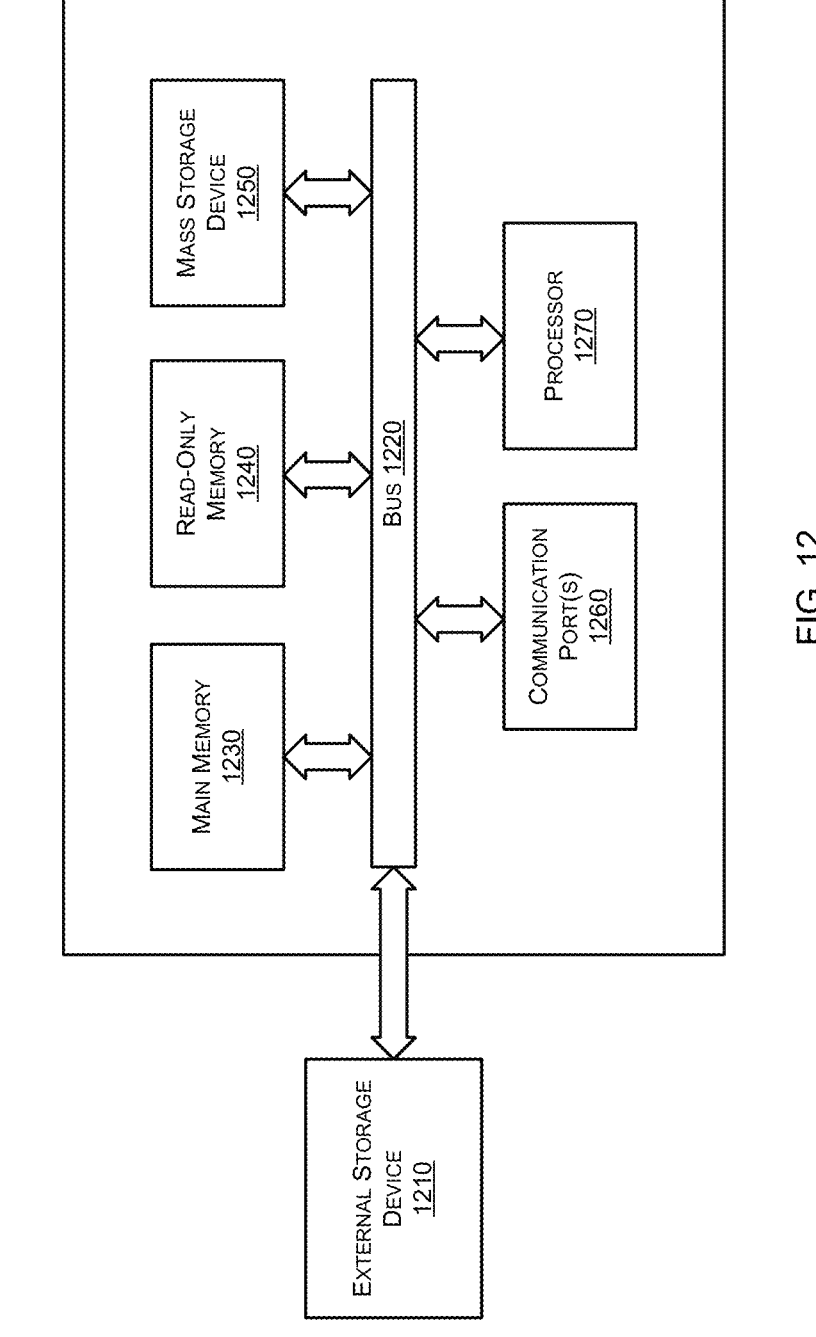
FIG. 12 illustrates an exemplary computer system in which or with which embodiments of the present invention can be utilized in accordance with embodiments of the present disclosure.

FIG. 12 illustrates an exemplary computer system in which or with which embodiments of the present invention can be utilized in accordance with embodiments of the present disclosure. As shown in FIG. 12, computer system 1200 can include an external storage device 1210, a bus 1220, a main memory 1230, a read only memory 1240, a mass storage device 1250, communication port 1260, and a processor 1270. A person skilled in the art will appreciate that the computer system may include more than one processor and communication ports. Examples of processor 1270 include, but are not limited to, an Intel® Itanium® or Itanium 2 processor(s), or AMD® Opteron® or Athlon MP® processor(s), Motorola® lines of processors, Forti-SOC™ system on chip processors or other future processors. Processor 12120 may include various modules associated with embodiments of the present invention. Communication port 1260 can be any of an RS-232 port for use with a modem based dialup connection, a 10/100 Ethernet port, a Gigabit or 10 Gigabit port using copper or fiber, a serial port, a parallel port, or other existing or future ports. Communication port 1260 may be chosen depending on a network, such a Local Area Network (LAN), Wide Area Network (WAN), or any network to which computer system connects. Memory 1230 can be Random Access Memory (RAM), or any other dynamic storage device commonly known in the art. Read-only memory 1240 can be any static storage device(s) e.g., but not limited to, a Programmable Read Only Memory (PROM) chips for storing static information e.g., start-up or BIOS instructions for processor 1270. Mass storage 1250 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 12K800), one or more optical discs, Redundant Array of Independent Disks (RAID) storage, e.g.

an array of disks (e.g., SATA arrays), available from various vendors including Dot Hill Systems Corp., LaCie, Nexsan Technologies, Inc. and Enhance Technology, Inc.

Bus 1220 communicatively couples processor(s) 1270 with the other memory, storage and communication blocks. Bus 1220 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 12120 to software system.

Optionally, operator and administrative interfaces, e.g. a display, keyboard, and a cursor control device, may also be coupled to bus 1220 to support direct operator interaction with a computer system. Other operator and administrative interfaces can be provided through network connections connected through communication port 1260. The external storage device 1210 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system and method that is highly affordable.

The present disclosure provides for a system and method that facilitates use of more functional and non-functional features that can be easily embedded.

The present disclosure provides for a system and method to facilitate a fully edge-based, and real-time user authentication.

The present disclosure provides for a system and method to facilitate an event-based processing.

The present disclosure provides for a system and method to facilitate a policy-based to adapt itself as per the prevailing situation and policies.

The present disclosure provides for a system and method to facilitate a cluster-centric architecture in the sense that the higher availability through horizontal scalability is being guaranteed.

The present disclosure provides for a system and method to facilitate an application architecture that is microservices-based and hence any kind of futuristic enhancements can be incorporated quickly and easily without any risk.

The present disclosure provides for a system and method to facilitate a portable system.

The present disclosure provides for a system and method to facilitate a configurable, customizable and composable system.

The present disclosure provides for a system and method to facilitate an extensible system to embed newer digital technologies and tools.

What is claimed is:

1. A system facilitating authentication, authorization, and access to a user to a locked facility of an entity, said system comprising:

an electronic card, said electronic card stores one or more details pertaining to an identity of the user;

a card reader operatively coupled to a locking mechanism of the locked facility of the entity, said card reader configured to receive the electronic card, wherein said card reader extracts one or more features associated with the one or more details pertaining to the identity of the user when the electronic card is swiped in the locking mechanism;

a plurality of sensors coupled to the locking mechanism, wherein said plurality of sensors sense a combination of opening, closing, breakage, and tempering of the locking mechanism; and an edge controller comprising a processor that executes a set of executable instructions that are stored in a memory, upon which execution, the processor causes the system to:

receive the one or more features from the card reader;

receive, from a database coupled to a server, a knowledge-base comprising a set of user details associated with the user, wherein, for each type of biometric feature, consent of the user is individually stored in the knowledge-base, and wherein the consent of the user is required to store one or more biometric features of the user;

extract a set of attributes corresponding to features associated with the user, said set of attributes extracted from the one or more details pertaining to the identity of the user;

map, through an Artificial Intelligence (AI) engine, the set of attributes with said knowledge-base to identify if the user is associated with the entity; and upon positive mapping of the set of attributes with the knowledge-base, authenticate the user to further gain access to the locking mechanism associated with the locked facility of the entity, wherein the edge controller is configured to enable local and instantaneous data capture and processing for user authentication, such that the authentication and access mechanism operates independently of network connectivity.

2. The system as claimed in claim 1, wherein the user is identified, verified and then authorized to access the system.

3. The system as claimed in claim 1, wherein the database coupled to the server is configured to store registration details, name, age, nationality, entity code number, id, pan details, account details, and biometric feature details with a time stamp.

4. The system as claimed in claim 1, wherein registration data is obtained based on a request from an unregistered user through a respective user device, and wherein login credentials are generated based on acknowledgement of the request and verification of the registration data.

5. The system as claimed in claim 1, wherein the one or more biometric features are extracted through biometric scanners.

6. The system as claimed in claim 1, wherein the AI engine identifies and authenticates the user through any or a combination of voice, password, OTP, facial feature, fingerprint, iris, DNA, skin, ear lobe, nose stored in the database.

7. The system as claimed in claim 1, wherein remote updating and synchronization of the system takes place with a cloud-based application and the database.

8. The system as claimed in claim 1, wherein the system is operatively coupled to one or more fire alarms, public address systems, emergency switches in a wireless and wireline manner.

9. The system as claimed in claim 1, wherein the system is configured with a security mechanism to prevent hacking by a third party.

10. The system as claimed in claim 1, wherein a micro service architecture (MSA) associated with the edge controller is configured to perform an onsite data capture, storage, matching, processing, decision-making and actuation logic through a plurality of microservices based containers.

11. The system as claimed in claim 10, wherein the MSA provides modularity and flexibility to accommodate any kind of changes for any real-time authentication and elimination of dependency-induced risks.

12. The system as claimed in claim 1, wherein the system is remotely monitored, and wherein a set of data packets is collected meticulously and deposited in a cloud- based data lake to be processed to extract actionable insights.

13. A method for facilitating authentication, authorization, and access to a user to a locked facility of an entity, said method comprising:

receiving, by an edge controller, one or more features from a card reader, wherein the one or more features are associated with one or more details pertaining to an identity of the user extracted by the card reader when an electronic card is swiped in a locking mechanism of the locked facility of the entity, wherein the electronic card stores the one or more details pertaining to the identity of the user, and wherein the card reader is operatively coupled to the locking mechanism, said card reader configured to receive the electronic card, and wherein the edge controller comprises a processor that executes a set of executable instructions that are stored in a memory;

receiving, from a database coupled to a server, a knowledge-base comprising a set of user details associated with the user;

storing consent of the user for each type of biometric feature in the knowledge-base, wherein the consent of the user is required to store one or more biometric features of the user;

extracting a set of attributes corresponding to features associated with the user, said set of attributes extracted from the one or more details pertaining to the identity of the user;

mapping, through an Artificial Intelligence (AI) engine, the set of attributes extracted with said knowledge-base to identify if the user is associated with the entity; and upon positive mapping of the set of attributes with the knowledge-base, authenticating the user to further gain access to the locking mechanism associated with the locked facility of the entity, wherein the edge controller is configured to enable local and instantaneous data capture and processing for user authentication, such that the authentication and access mechanism operates independently of network connectivity.

14. The method as claimed in claim 13, wherein the method further comprises:

obtaining registration data based on a request from an unregistered user through a respective user device, wherein login credentials are generated based on acknowledgement of the request and verification of the registration data.

15. The method as claimed in claim 13, wherein the method further comprises:

wherein the one or more biometric features are extracted through biometric scanners.

16. The method as claimed in claim 13, wherein the method further comprises:

identifying and authenticating the user by the AI engine through any or a combination of voice, password, OTP, facial feature, fingerprint, iris, DNA, skin, ear lobe, nose stored in the database.

17. The method as claimed in claim 13, wherein the method further comprises remote updating and synchronizing a system, associated with the edge controller, with a cloud-based application and the database.

18. The method as claimed in claim 13, wherein the method further comprises configuring a security mechanism to prevent hacking by a third party.

* * * * *